Figure 1:
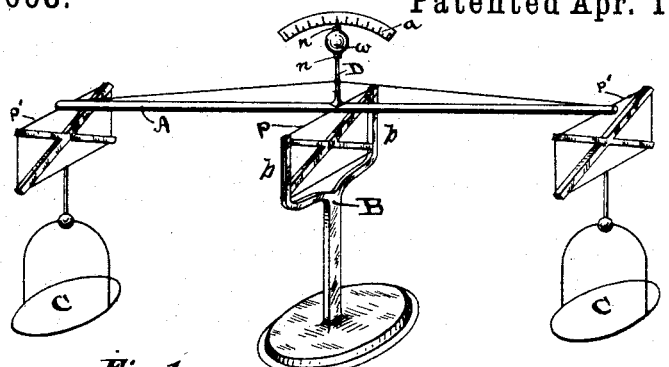

(No Model.)

F. A. ROEDER, Dec'd.
F. Davis, administrator.

TORSIONAL PIVOT BALANCE.

No. 340,008. Patented Apr. 13, 1886.

WITNESSES:
G. M. Cassatt
Abram May

INVENTOR
Frederick A. Roeder
Geo. Hall & R. M. Hosea
ATTORNEYS.

UNITED STATES PATENT OFFICE.

FREDERICK A. ROEDER, OF CINCINNATI, OHIO, FRANK DAVIS ADMINISTRATOR OF SAID FREDERICK A. ROEDER, DECEASED, ASSIGNOR, BY MESNE ASSIGNMENTS, TO THE UNITED STATES TORSION BALANCE AND SCALE COMPANY, OF JERSEY CITY, N. J.

TORSIONAL PIVOT-BALANCE.

SPECIFICATION forming part of Letters Patent No. 340,008, dated April 13, 1886.

Application filed July 10, 1884. Serial No. 137,293. (No model.)

*To all whom it may concern:*

Be it known that I, FREDERICK A. ROEDER, a citizen of the United States, residing at Cincinnati, Ohio, have invented new and useful Improvements in Torsional Pivot-Balances, of which the following is a specification.

My invention relates to balances or weighing-scales employing elastic pivots acting torsionally, instead of the ordinary contact-bearings, such as knife-edges. In such elastic-pivot balances the oscillations of the beam are opposed by the molecular resistance of the pivotal supports, and, obviously, the sensitiveness of the balance depends upon the degree to which such resistance can be overcome or reduced without being wholly destroyed.

In earlier torsion-scales the pivots employed were usually light and thin wires of steel or other elastic metal, stretched in sections of considerable relative length, with a view of reducing the molecular resistance; but, as will be readily understood, this mode of overcoming the difficulty practically confines the useful employment of the torsional principle to small and delicate balances for minute weighing; but by my present invention, the essential principle of which consists in opposing to the resistance of the pivot a counterbalancing force, pivots of any size, strength, or degree of tension may be employed, thereby extending the range of application of the torsional principle to scales of any magnitude, and securing all the advantages of sensitiveness, durability, and economy of construction resulting therefrom in all classes of scales used in the arts and in ordinary commercial business.

In carrying out my invention I employ a weight or "poise" connected with the beam above its pivotal center, and vibrating equally beyond at both sides of the vertical or neutral line of rest in which it is normally inoperative, the poise or weight being sufficiently heavy to locate the center of gravity of the beam above its fulcrum, the effect of which is to add the weight to the downwardly-deflected end of the beam, increased by leverage in proportion to the amount of deflection, and consequently in proportion to and practically neutralizing the torsional resistance of the pivot or pivots. The beam is brought to a position of stable equilibrium only when the pans are attached, and therefore the deflection of the beam downward at either end is resisted only by the weight at the other end, the overcoming of the torsional resistance of the pivot being effected by the poise above said pivot. The practical usefulness of this construction is further enhanced by making the poise adjustable in its vertical line of support, whereby the relation of the effective force of the weight to the molecular resistance of the pivot or pivots can be regulated and changed at will, and the balance thus rendered more or less sensitive, as may be desired for the special use or for the time being. An adjustment may be had by extending the foot or standard below the fulcrum-support, and attaching a small poise below the fulcrum upon such extension of the foot, provided the beam in such case is heavy enough to overbalance the molecular resistance of the pivot without such counter-balancing-weight.

Other features of my invention will be more particularly referred to in the following description.

Figure 2:
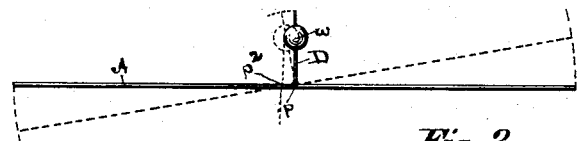
Figure 3:
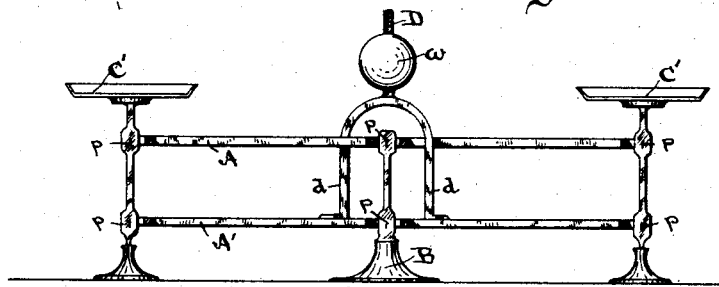
Figures 4, 5, 6, 7:
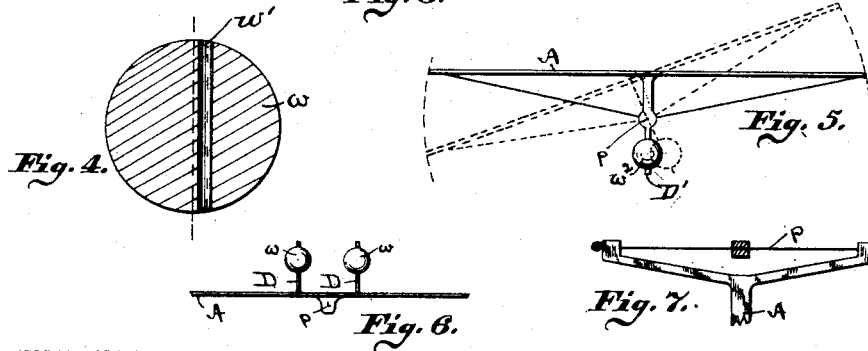

In the accompanying drawings mechanism embodying my invention is illustrated, in which Figure 1 is a perspective view of a simple-beam torsional pivot-scale embodying my improvement. Fig. 2 is a diagram illustrating the relative positions of the beam and poise at rest and deflected. Fig. 3 is a side elevation of a double-beam torsional pivot-scale, showing the application of the standard and poise to the lower beam. Fig. 4 is a vertical section of a poise bored eccentrically for mounting on a standard. Fig. 5 is a diagram of a modified form of beam, in which the weight for overcoming torsional resistance of the pivot is embodied in the beam itself. Fig. 6 is a side elevation of a beam having duplicate standards and poises. Fig. 7 is a plan or top view of one end of a beam, such as indicated in Fig. 3, the pivot-wire for the pan-support being stretched in a fork of the beam.

In the drawings, the letter A, Fig. 1, designates a simple beam mounted upon a torsional pivot, $p$, which may be any ordinary kind of torsional pivot, but in the present instance is supposed to be a wire stretched between the upwardly-projecting arms $b$ $b$ of a bifurcated support, B, said wire being firmly secured to the beam in any convenient manner, and opposing a torsional molecular resistance to the deflection of the beam from its normal position of rest.

C C are the scale-pans, suspended from the ends of the beam by torsional pivots $p'$ $p'$, similar to that upon which the beam is mounted. The pans may be supported above the beam ends, as shown at C′ C′ in Fig. 3.

Centrally from and above the beam rises a vertical standard, D, which may also be utilized as a pointer or indicator in connection with a graduated arc bar, $a$, upon which standard is mounted a weight or poise, $w$, proportioned to the molecular resistance of the beam-fulcrum and terminal pivots, (where the latter are used.) The poise $w$ is preferably adjustable by means of nuts $n$ $n$ above and below, secured by a thread cut upon the standard, as indicated in Fig. 1, or by threading the poise directly upon the standard, as shown in Fig. 3, to be elevated and depressed by rotation or in any other suitable manner.

The action of the poise is illustrated in Fig. 2, in which the beam and poise are shown in their normal position of rest, and their deflected position indicated by dotted lines. It will be seen that as a result of deflection the effective force of the weight is transferred from the neutral point at the pivot $p$ to the point $p^2$, where it acts to counterbalance the molecular resistance of the fulcrum-pivot, and that its effective value depends upon the relative distance of the point $p^2$ (where the perpendicular dropped from the center of mass $w$ intersects the beam axis) from the beam center, and as this depends upon the angle of deflection of the beam the weight increases in direct proportion to the increase of molecular resistance. It will be obvious, also, that a small weight mounted on a long standard will produce practically the same result as a larger weight mounted upon a shorter standard, as the effective value of the weight is dependent upon its leverage.

In Fig. 3 I have shown the application of the poise $w$ to a double-beam scale, in which case it is desirable, for constructive convenience and economy of space, to attach the standard to the lower beam. To this end I bifurcate the standard D into two feet, $d$ $d$, secured to the lower beam, A′, at both sides of the beam-fulcrum $p$, and spaced sufficiently apart to permit the oscillation of the standard without interference with the operations of the beam and fulcrum. The construction is clearly exhibited in the drawings, and will require no further description. In using the poise in this manner it may also be made to serve the purpose of a balance-regulator by securing it in an eccentric position upon the standard, to which end it is perforated eccentrically, as indicated at $w'$ in Fig. 4. Thus mounted upon its standard, the excess of weight may be adjusted to different positions with relation to the beam center by partially rotating the poise upon its supporting-standard.

In Fig. 5 is illustrated a modification in the construction of the beam, whereby the separate poise may be dispensed with and the shifting weight introduced into the beam itself. In this the beam is extended centrally below the horizontal line of the end pivots and the fulcrum $p$ attached at such lower point. It will be obvious that in such case the deflection of the beam transfers the excess of weight to the downwardly-deflected end, (to the left of the fulcrum in the case indicated by the dotted lines in the figure,) and that such construction is the same in effect as one in which a fixed poise is placed above the fulcrum, as first described. I may, however, by projecting a supporting-bar, D′, below the fulcrum and attaching a small counterbalancing-poise, $w^2$, adjustably thereto attain the same advantages in varying and regulating the relation of weight to the pivot-resistance as first described, provided, however, that the beam-weight in such case must be in excess of that actually required, so as to be reduced in effect by the counter-balance $w^2$.

In Fig. 6 I have shown an obvious modification of the standard and poise, in which two standards, D D, rising from the beam at equal distances on opposite sides of the fulcrum center, are separately provided with poises. The arrangement, although the same in substantial effect as that first shown, is inferior to the single standard and poise.

I claim as my invention and desire to secure by Letters Patent of the United States—

1. In a torsional pivot-balance, a balance-beam provided with a standard rising above the beam in a vertical line of the fulcrum-pivot, in combination with a counterpoise-weight proportioned to the molecular resistance of the pivots and adjustable both vertically and horizontally on said standard, substantially as and for the purpose set forth.

2. In a torsional pivot-balance, a balance-beam mounted upon a torsional fulcrum-pivot and provided with a standard projecting in vertical line with said pivot, of a poise mounted upon said standard in position to locate the common center of gravity above the pivot, and adjustable both laterally and vertically, as set forth.

3. In a torsional pivot-balance, the combination of a beam, a central vertical standard rigidly attached thereto, and a counterpoise-weight eccentrically mounted upon said standard, as and for the purpose set forth.

In testimony whereof I have hereunto set my hand in the presence of two subscribing witnesses.

FREDERICK A. ROEDER.

Witnesses:
L. M. HOSEA,
C. F. SHAPPELL.